United States Patent
Chung et al.

(10) Patent No.: US 12,416,987 B2
(45) Date of Patent: Sep. 16, 2025

(54) TOUCHPAD WITH A FORCE SENSING FUNCTION AND RESISTIVE PRESSURE SENSOR THEREOF

(71) Applicant: ELAN MICROELECTRONICS CORPORATION, Hsinchu (TW)

(72) Inventors: Pin-Jung Chung, Taoyuan (TW); Tien-Wen Pao, Zhubei (TW); Ching-Shoung Chang, Taipei (TW); Shun-Chieh Wu, New Taipei (TW); En-Hsiao Liao, Taipei (TW); Yu Chiang, Taoyuan (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 18/940,126

(22) Filed: Nov. 7, 2024

(65) Prior Publication Data

US 2025/0173016 A1 May 29, 2025

(30) Foreign Application Priority Data

Nov. 23, 2023 (TW) .................. 112145416

(51) Int. Cl.
*G06F 3/041* (2006.01)
*G01L 1/22* (2006.01)
(Continued)

(52) U.S. Cl.
CPC ........ *G06F 3/04146* (2019.05); *G01L 1/2262* (2013.01); *G06F 3/045* (2013.01); *G06F 3/044* (2013.01); *G06F 2203/04105* (2013.01)

(58) Field of Classification Search
CPC ............... G01L 1/2262; G06F 3/04146; G06F 3/045; G06F 3/044; G06F 2203/04105
(Continued)

(56) References Cited

U.S. PATENT DOCUMENTS

2019/0049326 A1* 2/2019 Li .................. G01L 9/0054
2019/0257704 A1* 8/2019 Steyn .................. G01L 1/22

FOREIGN PATENT DOCUMENTS

CN 108604149 B 6/2021
CN 114967949 A * 8/2022 ......... G06F 3/03547
(Continued)

OTHER PUBLICATIONS

Machined English Translation for CN 114967949 A, 2025, pp. 1-21 (Year: 2025).*

*Primary Examiner* — Jimmy H Nguyen
(74) *Attorney, Agent, or Firm* — patenttm.us (57) ABSTRACT

A touchpad with a force sensing function and resistive pressure sensor thereof are disclosed. The resistive pressure sensor has a circuit board and a Wheatstone bridge circuit mounted on a deformation zone of the circuit board. The deformation zone deforms when a touchpad body is pressed by a force. The Wheatstone bridge circuit has a first upper-arm resistor, a first lower-arm resistor, a second upper-arm resistor and a second lower-arm resistor. The four arm resistors are in the deformation zone. A direction of current through the first lower-arm resistor and the second upper-arm resistor is different from a direction of current through the second lower-arm resistor and the first upper-arm resistor. Therefore, when the deformation zone of the circuit board deforms by the force, an output voltage of the Wheatstone bridge circuit is relatively increased to enhance a force sensitivity.

19 Claims, 6 Drawing Sheets

(51) Int. Cl.
*G06F 3/044* (2006.01)
*G06F 3/045* (2006.01)

(58) Field of Classification Search
USPC .......................................................... 345/174
See application file for complete search history.

(56) References Cited

FOREIGN PATENT DOCUMENTS

CN           115628840 A     1/2023
WO      2019/014866 A1   1/2019

* cited by examiner

TOUCHPAD WITH A FORCE SENSING FUNCTION AND RESISTIVE PRESSURE SENSOR THEREOF

CROSS-REFERENCE TO RELATED APPLICATIONS

This application is based upon and claims priority under 35 U.S.C. 119 from Taiwan Patent Application No. 112145416 filed on Nov. 23, 2023, which is hereby specifically incorporated herein by this reference thereto.

BACKGROUND OF THE INVENTION

1. Field of the Invention

The present invention is related to a touchpad and more particularly to a touchpad with a force sensing function and resistive pressure sensor thereof.

2. Description of the Prior Arts

To increase touch functions, a force sensing function is added to a touchpad. The touchpad has a touch electrode layer and a force sensing layer. The force sensing layer has a plurality of force sensing electrodes. When an object is on the touchpad, the force sensing electrode receives a driving signal to establish a basic capacitor to ground between the driven force sensing electrode and a ground layer. When the object presses down on the touchpad, the force sensing electrodes detect a new capacitance. A difference between the currently detected capacitance and a capacitance of the basic capacitor to ground corresponds to a deformation variation of the force sensing electrode. A downforce exerted by the object is calculated based on the difference.

Since the capacitance of the basic capacitor to ground is fixed, the fine changes in force are difficult to identify if the difference between the currently detected capacitance and the capacitance of the basic capacitor to ground is too large when the object presses down on the touchpad.

To overcome the shortcomings, the present invention provides a touchpad with a force sensing function and resistive pressure sensor thereof to mitigate or to obviate the aforementioned problems.

SUMMARY

An objective of the present invention is to provide a touchpad with a force sensing function and resistive pressure sensor thereof to sense larger downforce.

The resistive pressure sensor of the touchpad has:
a circuit board having a deformation zone, wherein the deformation zone of the circuit board deforms along a first deformation direction when the circuit board is pressed; and
a Wheatstone bridge circuit formed on the circuit board and having:
  a first serial-connecting resistor unit positioned in the deformation zone and having a first upper-arm resistor and a first lower-arm resistor, wherein the first upper-arm resistor has a first end and a second and the first lower-arm resistor has another first end and another second end, and the second end of the first upper-arm resistor is connected to the first end of the first lower-arm resistor; and
  a second serial-connecting resistor unit positioned in the deformation zone, connected in parallel to the first serial-connecting resistor unit, and having a second upper-arm resistor and a second lower-arm resistor, wherein the second upper-arm resistor has a first end and a second end, the second lower-arm resistor has another first end and another second end, and the second end of the second upper-arm resistor is connected to the first end of the second lower-arm resistor; wherein the first end of the first upper-arm resistor and the first end of the second upper-arm resistor are commonly connected to a high potential terminal of a DC power source, the second end of the first lower-arm resistor and the second end of the second lower-arm resistor are commonly connected to a low potential terminal of the DC power source, and two serial-connecting nodes of the first serial-connecting resistor unit and the second serial-connecting resistor unit are used as two voltage output terminals; wherein
  a direction of current passing through the first lower-arm resistor and a direction current passing through the second upper-arm resistor are parallel to the first deformation direction; and
  a direction of current passing through the second lower-arm resistor and a direction of current passing through the first upper-arm resistor are different from the first deformation direction.

The Wheatstone bridge circuit is formed on the circuit board, and each arm resistor is in the deformation zone. The direction of current passing through the first lower-arm resistor and the second upper-arm resistor is different from the direction of current passing through the second lower-arm resistor and the first upper-arm resistor. In this way, an amplified output voltage difference can be obtained when the deformation zone is pressed by an external force according to the output voltage formula of the Wheatstone bridge circuit. Thereby, the present invention senses a larger downforce and increases a sensitivity of force sensing.

The touchpad with a force sensing function has:
a bracket having a plurality of cantilevers, each of the cantilevers has a joint and a free end opposite to the joint;
a plurality of resistive pressure sensors as mentioned above mounted on the bracket, and the deformation zone of the resistive pressure sensors corresponding to the joint of the cantilever; and
a touchpad body mounted on the bracket and covering the resistive pressure sensors, and the touchpad body has:
  a carrier having a surface;
  a plurality of sensing electrodes formed on the surface of the carrier;
  a cover covering the carrier and the sensing electrodes; and
  a controller electrically connected to the sensing electrodes and the resistive pressure sensors.

The resistive pressure sensors are mounted between the touchpad body and the bracket. The deformation zone of each resistive pressure sensor corresponds to the joint of the corresponding cantilever. When the touchpad body is pressed, the deformation zones of the circuit boards on the cantilevers of the bracket deform accordingly to enlarge an output voltage difference of the Wheatstone bridge circuit. Therefore, the present invention senses a larger downforce and increases a sensitivity of force sensing.

Other objectives, advantages and novel features of the invention will become more apparent from the following detailed description when taken in conjunction with the accompanying drawings.

DETAILED DESCRIPTION OF THE EMBODIMENTS

The present invention relates to a touchpad with a force sensing function. The technical content will be described in detail below with reference to embodiments and drawings.

Figure 1:
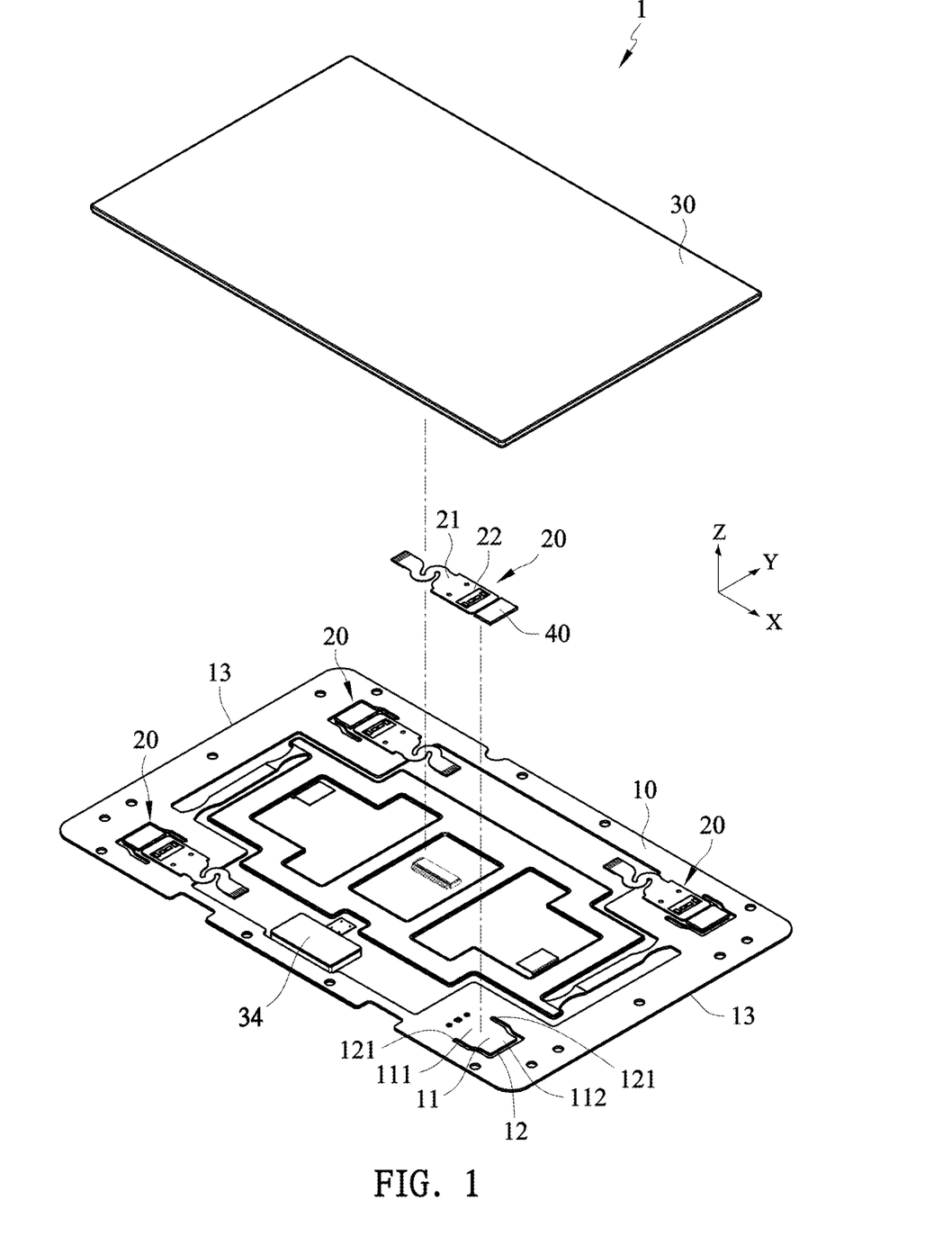
FIG. 1 is an exploded view of a touchpad with a force sensing function in accordance with the present invention.

With reference to FIG. 1, the touchpad 1 with the force sensing function has a bracket 10, a plurality of resistive pressure sensors 20 and a touchpad body 30.

The bracket 10 has a plurality of cantilevers 11. In the present embodiment, the bracket 10 is rectangular and four cantilevers 11 are respectively located at four corners of the bracket 10. The bracket 10 is made of a metal plate, and a U-shaped through slot 12 is defined at the each corner to cut the metal plate and form the cantilever 11. Each of the cantilevers 11 has a joint and a free end opposite to the joint. The joint 111 is located between the two end 121 of the corresponding U-shaped through slot 12 and serves as a connecting area between the bracket 10 and the corresponding cantilever 11. In one embodiment, the free end 112 of each cantilever 11 faces a nearest short side 13 of the bracket 10. A shock absorber pad 40 is further mounted between the bracket 10 and the touchpad body 30.

Figure 2:
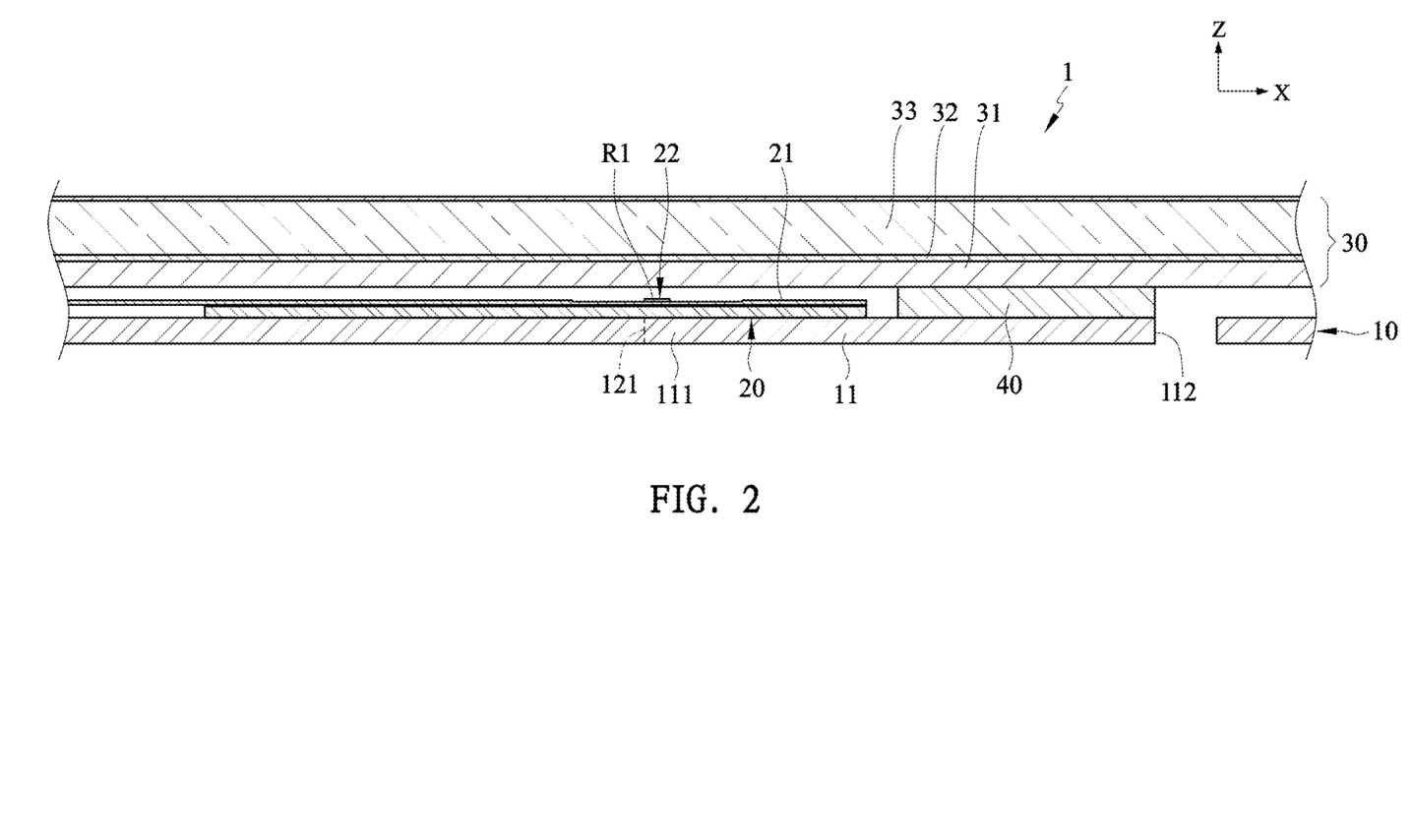
FIG. 2 is a cross-sectional view in partial of the touchpad with the force sensing function in accordance with the present invention.
Figure 3:
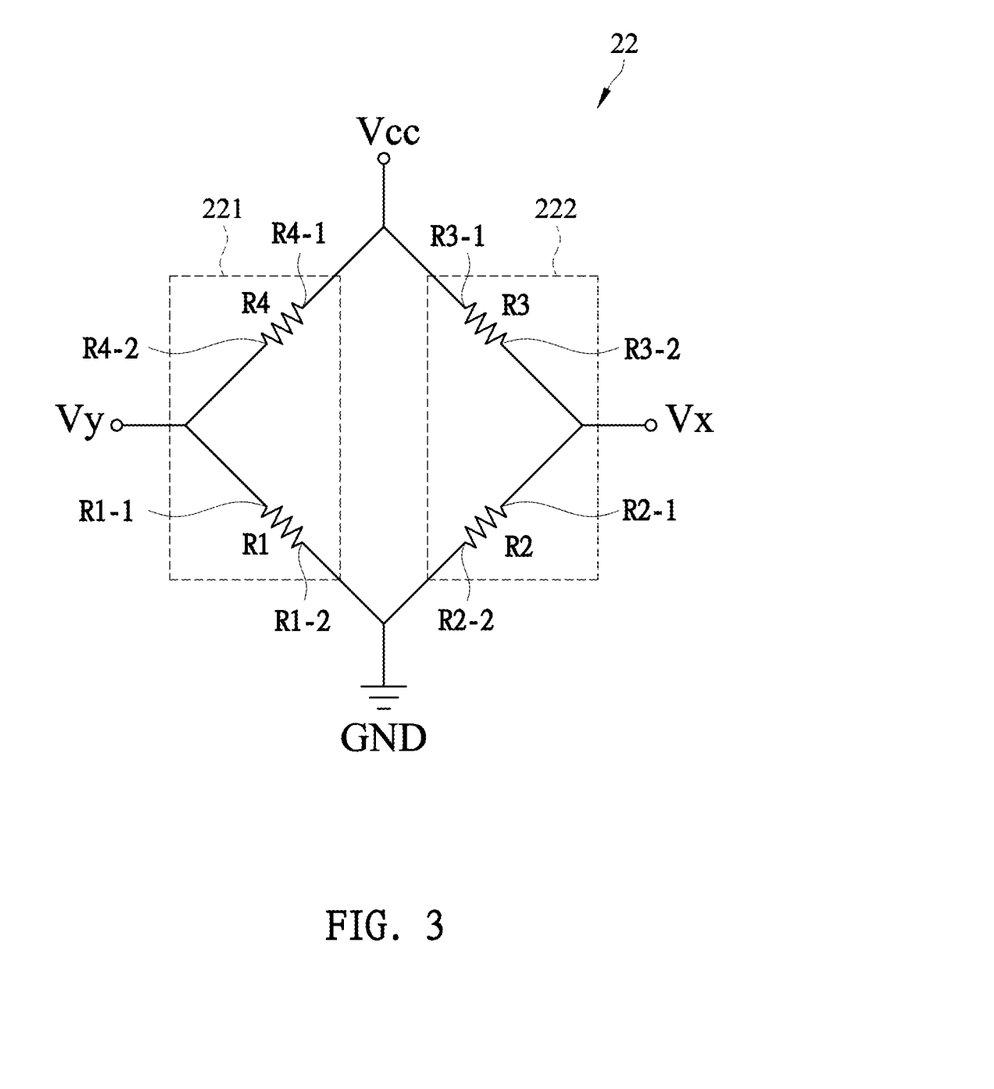
FIG. 3 is a circuit diagram of Wheatstone bridge circuit in accordance with the present invention.
Figure 4A:
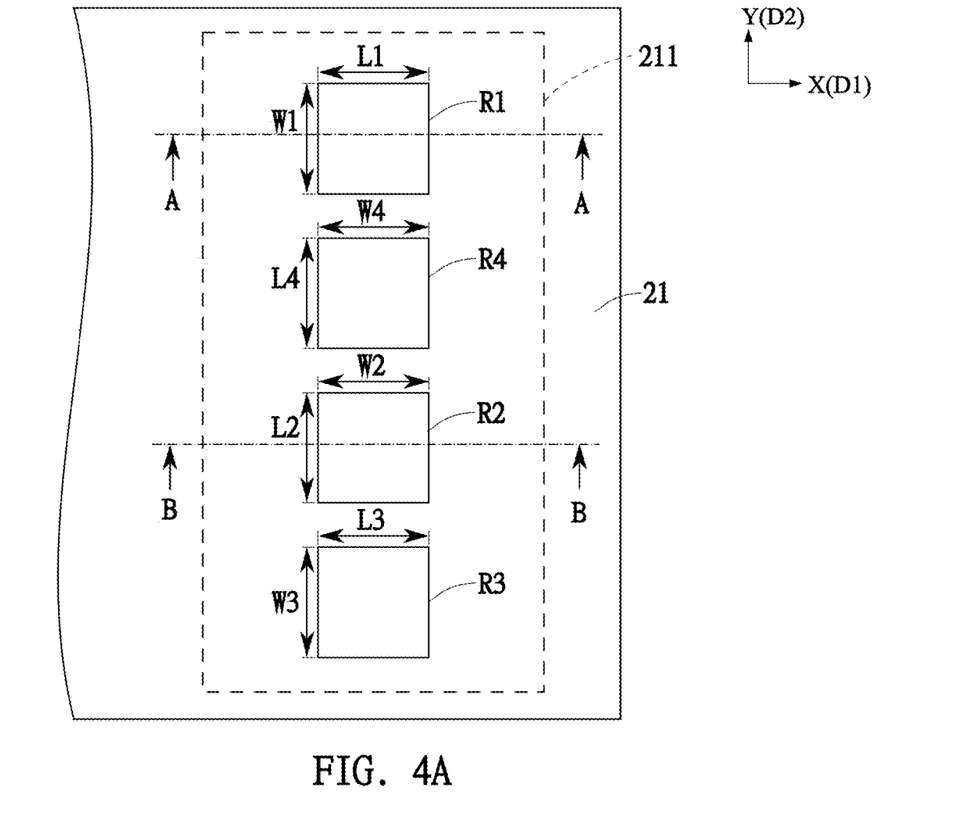
FIG. 4A, is a top plan view of four arm resistors of the Wheatstone bridge circuit in accordance with the present invention.
Figure 6A:
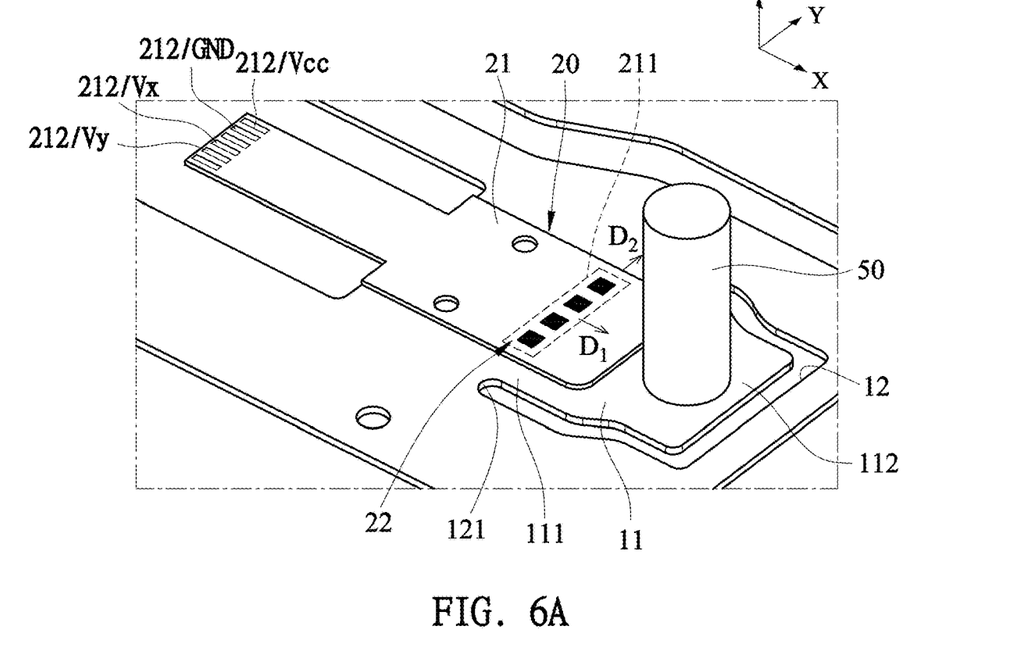
FIGS. 6A and 6B are schematic diagrams of the deformation of the touch panel with force sensing function in accordance with the present invention before and after being subjected to pressure.
Figure 6B:
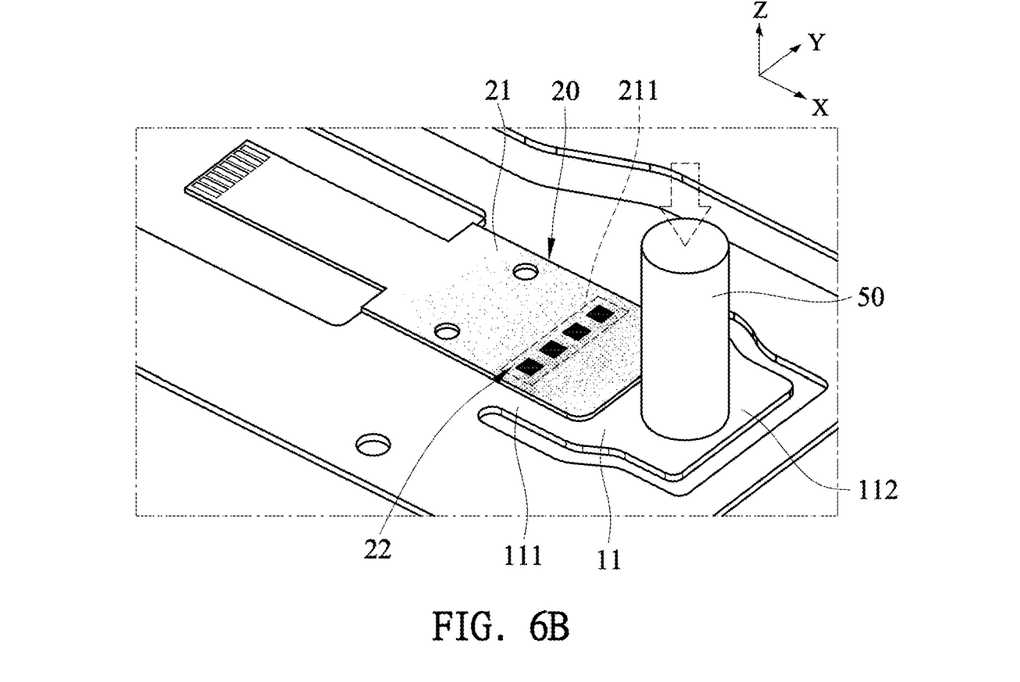

With reference to FIG. 2, the resistive pressure sensors 20 are respectively mounted on the cantilevers 11 of the bracket 10. Each resistive pressure sensor 20 has a circuit board 21 and a Wheatstone bridge circuit 22, as shown in FIG. 3. With further reference to FIG. 6A, the circuit board 21 has a deformation zone 211 and a plurality of pads 212. In the present embodiment, the deformation zone 211 corresponds to the joint 111 of the corresponding cantilever 11. When the cantilever 11 is pressed by an external force, the deformation zone 211 of the circuit board 21 deforms along with the cantilever 11. A test pole 50 is placed on one of the cantilevers 11 and near the free end 112 of the cantilever 11. The test pole 50 is pressed down along the Z-axis direction, causing the cantilever 11 to deform slightly downward, as shown in FIG. 6B. At the time, as shown in FIG. 4C, the deformation zone 211 of the circuit board 21, which corresponds to the joint 111, has a maximum deformation. The deformation zone 211 has a first deformation direction D1 and a second deformation direction D2. In the present embodiment, the first deformation direction D1 is parallel to the X-axis direction and the second deformation direction D2 is different from to the first deformation direction D1. In one embodiment the second deformation direction D2 is parallel to the Y-axis direction. That is, the second deformation direction D2 is orthogonal to the first deformation direction D1. In the present embodiment, the circuit board 21 is a flexible circuit board, but not limited to.

Each of the Wheatstone bridge circuits 22 is mounted on the corresponding circuit board 21. With further reference to FIG. 3, each of the Wheatstone bridge circuits 22 has a first serial-connecting resistor unit 221 and a second serial-connecting resistor unit 222 connected in parallel to the first serial-connecting resistor unit 221. The first serial-connecting resistor unit 221 has a first upper-arm resistor R4 and a first lower-arm resistor R1. Each of the first upper-arm resistors R4 and the first lower-arm resistor R1 has a first end R4-1, R1-1 and second end R4-2, R1-2. The second serial-connecting resistor unit 222 has a second upper-arm resistor R3 and a second lower-arm resistor R2. Each of the second upper-arm resistors R3 and the second lower-arm resistor R2 has a first end R3-1, R2-1 and second end R3-2, R2-2. The first end R4-1 of the first upper-arm resistor R4 and the first end R3-1 of the second upper-arm resistor R3 are commonly connected to a high potential terminal Vcc of a DC power source. The second end R1-2 of the first lower-arm resistor R1 and the second end R2-2 of the second lower-arm resistor R2 are commonly connected to a low potential terminal GND of the DC power source. Two serial-connecting nodes between the first and second serial-connecting resistor units 221, 222 are used as two output voltage terminals Vy, Vx. In the present embodiment, as shown in FIG. 6A, the pads 212 of the circuit board 21 are electrically connected to the high potential terminal Vcc, the low potential terminal GND and the two output voltage terminals Vy, Vx and are located outside of the deformation zone 211. In one embodiment, the pads 212 are positioned to one side of the circuit board 21 and away from the deformation zone 211 and the free end 112 of the cantilever 11.

Figure 5A:
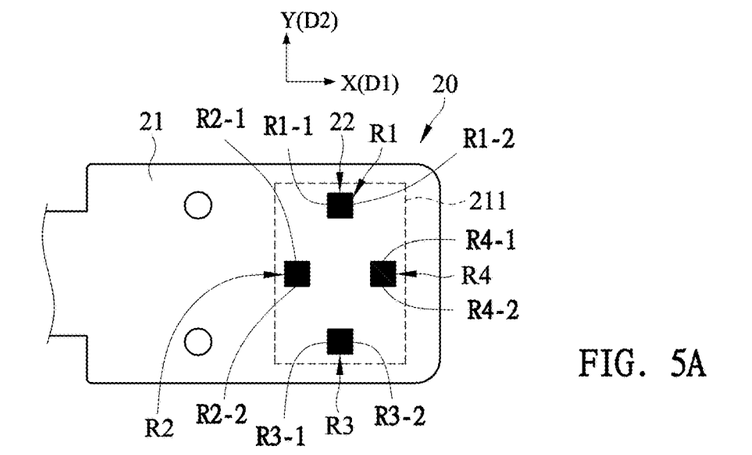
FIG. 5A is a top view of the resistive pressure sensor in accordance with the present invention.
Figure 5B:
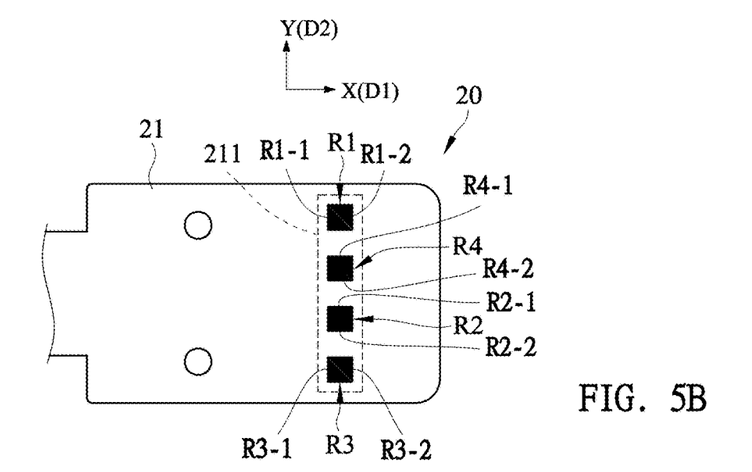
FIG. 5B is a top view of another resistive pressure sensor in accordance with the present invention.
Figure 5C:
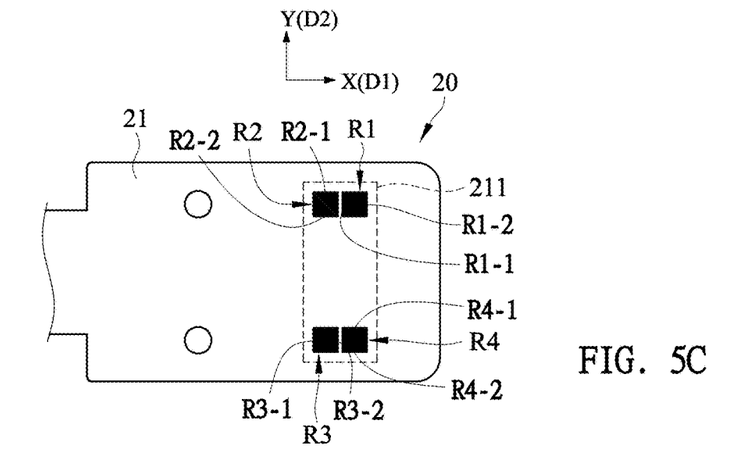
FIG. 5C is a top view of another resistive pressure sensor in accordance with the present invention.

With reference to FIGS. 5A, 5B and 5C, the various configurations of the first upper-arm resistor R4, the first lower-arm resistor R1, the second upper-arm resistor R3 and the second lower-arm resistor R2 correspond to the different deformation zones 211 and different sizes of the circuit boards 21. As shown in FIG. 5A, the first lower-arm resistor R1 and the second upper-arm resistor R3 of FIG. 3 are positioned in two opposite vertical positions, and the second lower-arm resistor R2 and the first upper-arm resistor R4 are located in two opposite horizontal positions. Therefore, the four arm resistors R1 to R4 are arranged in a cross configuration. As shown in FIG. 5B, the first lower-arm resistor R1, the first upper-arm resistor R4, the second lower-arm resistor R2 and the second upper-arm resistor R3 of FIG. 3 are arranged in a single line. As shown in FIG. 5C, the first lower-arm resistor R1 and the second lower-arm resistor R2 of FIG. 3 are arranged side by side in an upper area of the deformation zone 211. The second upper-arm resistor R3 and the first upper-arm resistor R4 of FIG. 3 are arranged side by side in a lower area of the deformation zone 211. Therefore, the four arm resistors R1 to R4 are arranged in a rectangular shape. Furthermore, the first lower-arm resistor R1 and the second upper-arm resistor R3 may be located at two diagonal positions in the deformation zone 211, and the second lower-arm resistor R2 and the first upper-arm resistor R4 may be located at the other two diagonal positions in the deformation zone 211.

No matter which configuration mentioned above is applied, the direction of current through the first lower-arm resistor R1 is from the first end R1-1 to the second end R1-2 of the first lower-arm resistor R1. The direction of current through the second upper-arm resistor R3 is from the first end R3-1 to the second end R3-2 of the second upper-arm resistor R3. The direction of current through the first lower-arm resistor R1 and the direction of current through the second upper-arm resistor R3 are parallel to the first deformation direction D1, which is the X-axis direction. With reference to FIGS. 4A and 5B, a length L1 of the first lower-arm resistor R1 is defined from the first end R1-1 to the second end R1-2. A length L3 of the second upper-arm resistor R3 is defined from the first end R3-1 to the second end R3-2. A distance of each of the first lower-arm resistor R1 and the second upper-arm resistor R3 is defined between two opposite sidewalls in a direction parallel to the second deformation direction D2, which is the Y-axis direction. The distances are regarded as widths W1, W3 of the first lower-arm resistor R1 and the second upper-arm resistor R3. The direction of current through the second lower-arm resistor R2 is from the first end R2-1 to the second end R2-2 of the second lower-arm resistor R2. The direction of current through the first upper-arm resistor R4 is from the first end R4-1 to the second end R4-2 of the first upper-arm resistor R4. The direction of current through the second lower-arm resistor R2 and the direction of current through the first upper-arm resistor R4 are parallel to the second deformation direction D2, which is the Y-axis direction. With reference to FIGS. 4A and 5B, a length L2 of the second lower-arm resistor R2 is defined from the first end R2-1 to the second end R2-2. A length L4 of the first upper-arm resistor R4 is defined from the first end R4-1 to the second end R4-2. A distance of each of the second lower-arm resistor R2 and the first upper-arm resistor R4 is defined between two opposite sidewalls in a direction parallel to the first deformation direction D1, which is the X-axis direction. The distances are regarded as widths W2, W4 of the second lower-arm resistor R2 and the first upper-arm resistor R4. In the present embodiment, a deformation along the first deformation direction D1 of the deformation zone 211 is larger than a deformation along the second deformation direction D2 thereof when the deformation zone 211 of the circuit board 21 is pressed by the external force.

Figure 4B:
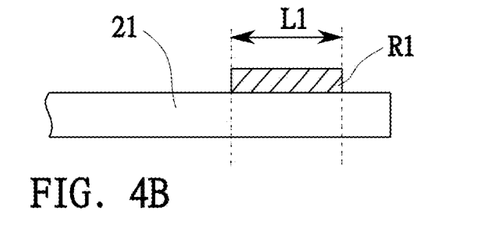
FIG. 4B is a cross-sectional view of one arm resistor taken along line A-A of FIG. 4A.
Figure 4C:
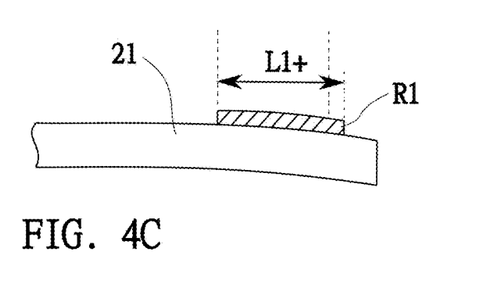
FIG. 4C is cross sectional view of one arm resistor stretched FIG. 4B.
Figures 4D, 4E:
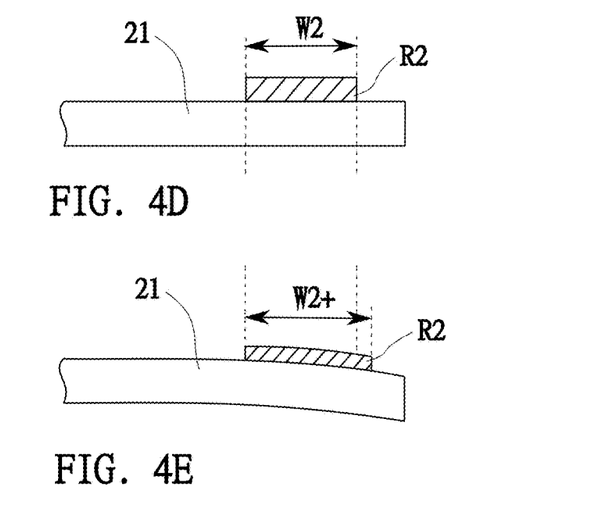
FIG. 4D is a cross-sectional view of another arm resistor taken along line B-B of FIG. 4A.
FIG. 4E is cross sectional view of one arm resistor stretched FIG. 4D.

Using FIG. 5B as an example, since the deformation along the first deformation direction D1 of the deformation zone 211 of the circuit board 21 is larger than the deformation along the second deformation direction D2 thereof, as shown in FIGS. 4B and 4C, the length L1 of the first lower-arm resistor R1 is elongated to a longer length L1+ and the length L3 of the second upper-arm resistor R3 is also elongated when the deformation zone 211 of the circuit board 21 is deformed by the external force, as shown in FIG. 6B. With reference to FIGS. 4D and 4E, the width W2 of the second lower-arm resistor R2 is increased to a wider width W2+ and the width W4 of the first upper-arm resistor R4 is also increased. According to the law of resistance:

$$R = \rho \frac{L}{W \times T};$$

wherein ρ is resistivity, L is length of a resistor and W×T is cross-sectional area of the first end or the second end, a resistance of the first lower-arm resistor R1 and the second upper-arm resistor R3 increases due to the longer length, while a resistance of the second lower-arm resistor R2 and the first upper-arm resistor R4 decreases due to the wider width. An output voltage Vo of the Wheatstone bridge circuit 22 is calculated using the following equation:

$$V_O = V_y - V_x = V_{cc}\left(\frac{R_1}{R_1 + R_4} - \frac{R_2}{R_2 + R_3}\right);$$

wherein $V_{CC}$ is DC power. This means the potential of one output voltage terminal Vy increases while the other output voltage terminal Vx decreases. Therefore, after the potentials of the two voltage output terminals Vy and Vx are subtracted, the obtained output voltage and the output voltage Vo is relatively increased. In one embodiment, the arm resistors may be formed in identical or varying shapes, and the arm resistors may be made of carbon film through a screen printing, but not limited to.

The touchpad body 30 is mounted on the bracket 10. The resistive pressure sensors 20 are arranged on the corners of the bracket 10 and covered by the touchpad body 30. When the touchpad body 30 is pressed down, the four cantilevers 11 of the bracket 10 deform in varying degrees according to a location of pressing on the touchpad body 30. At the time, the deformation zone 211 of the circuit board 21 on the corresponding cantilever 11 deforms synchronously to sense pressing force. In the present embodiment, as shown in FIGS. 1 and 2, the touchpad body 30 has a carrier 31, a plurality of sensing electrodes 32, a cover 33 and a controller 34. The sensing electrodes 32 are formed on one surface of the carrier 31. The cover 33 covers the carrier 31 and the sensing electrodes 32. The controller 34 is electrically connected to the sensing electrodes 32 and the resistive pressure sensors 20.

Based on the foregoing description, a plurality of resistive pressure sensors are mounted between the bracket and the touchpad body, with the deformation zone of each resistive pressure sensor corresponds to the joint of the cantilever of the bracket. Each of the arm resistors of the Wheatstone bridge circuit is positioned in the deformation zone, but the directions of current passing through the first lower-arm resistor and the second upper-arm resistor are different from the directions of current passing through the second lower-arm resistor and the first upper-arm resistor. When the touchpad body is pressed, the deformation zone of the circuit board on the cantilever synchronously deforms. As a result, according to the Wheatstone bridge equation for output voltage, the output voltage increases, enhancing the sensing value and improving a force sensitivity.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A resistive pressure sensor comprising:
   a circuit board having a deformation zone, wherein the deformation zone of the circuit board deforms along a first deformation direction when the circuit board is pressed; and
   a Wheatstone bridge circuit formed on the circuit board and having:
      a first serial-connecting resistor unit positioned in the deformation zone and having a first upper-arm resistor and a first lower-arm resistor, wherein the first upper-arm resistor has a first end and a second end and the first lower-arm resistor has another first end and another second end, and the second end of the first upper-arm resistor is connected to the first end of the first lower-arm resistor; and
      a second serial-connecting resistor unit positioned in the deformation zone, connected in parallel to the first serial-connecting resistor unit, and having a second upper-arm resistor and a second lower-arm resistor, wherein the second upper-arm resistor has a first end and a second end and the second lower-arm resistor has another first end and another second end, and the second end of the second upper-arm resistor is connected to the first end of the second lower-arm resistor; wherein the first end of the first upper-arm resistor and the first end of the second upper-arm resistor are commonly connected to a high potential terminal of a DC power source, the second end of the first lower-arm resistor and the second end of the second lower-arm resistor are commonly connected to a low potential terminal of the DC power source, and two serial-connecting nodes between the first serial-connecting resistor unit and the second serial-connecting resistor unit are used as two voltage output terminals; wherein
         a direction of current passing through the first lower-arm resistor and a direction current passing through the second upper-arm resistor are parallel to the first deformation direction; and
         a direction of current through the second lower-arm resistor and a direction of current through the first upper-arm resistor are different from the first deformation direction.

2. The resistive pressure sensor as claimed in claim 1, wherein
   the deformation zone of the circuit board deforms along a second deformation direction when the circuit board is pressed, wherein a deformation of the deformation zone along the second deformation direction is less than a deformation of the deformation zone along the first deformation direction; and
   the direction of current through the second lower-arm resistor and the direction of current through the first upper-arm resistor are parallel to the second deformation direction.

3. The resistive pressure sensor as claimed in claim 2, wherein the first deformation direction is orthogonal to the second deformation direction.

4. The resistive pressure sensor as claimed in claim 3, wherein
   the first lower-arm resistor and the second upper-arm resistor are located at two diagonal positions in the deformation zone; and
   the second lower-arm resistor and the first upper-arm resistor are located at the other two diagonal positions in the deformation zone.

5. The resistive pressure sensor as claimed in claim 4, wherein the first lower-arm resistor, the second upper-arm resistor, the second lower-arm resistor and the first upper-arm resistor are arranged in a cross configuration or in a rectangular shape.

6. The resistive pressure sensor as claimed in claim 3, wherein the first lower-arm resistor, the second upper-arm resistor, the second lower-arm resistor and the first upper-arm resistor are arranged in a single line.

7. The resistive pressure sensor as claimed in claim 3, wherein the circuit board has a plurality of pads electrically connected to the high potential terminal, the low potential terminal of the DC power source, and the two output voltage terminals, with the pads being located outside of the deformation zone.

8. The resistive pressure sensor as claimed in claim 2, wherein
   the first lower-arm resistor and the second upper-arm resistor are located at two diagonal positions in the deformation zone; and
   the second lower-arm resistor and the first upper-arm resistor are located at the other two diagonal positions in the deformation zone.

9. The resistive pressure sensor as claimed in claim 8, wherein the first lower-arm resistor, the second upper-arm resistor, the second lower-arm resistor and the first upper-arm resistor are arranged in a cross configuration or in a rectangular shape.

10. The resistive pressure sensor as claimed in claim 2, wherein the first lower-arm resistor, the second upper-arm resistor, the second lower-arm resistor and the first upper-arm resistor are arranged in a single line.

11. The resistive pressure sensor as claimed in claim 2, wherein the circuit board has a plurality of pads electrically connected to the high potential terminal, the low potential terminal of the DC power source, and the two output voltage terminals, with the pads being located outside of the deformation zone.

12. The resistive pressure sensor as claimed in claim 1, wherein
   the first lower-arm resistor and the second upper-arm resistor are located at two diagonal positions in the deformation zone; and
   the second lower-arm resistor and the first upper-arm resistor are located at the other two diagonal positions in the deformation zone.

13. The resistive pressure sensor as claimed in claim 12, wherein the first lower-arm resistor, the second upper-arm resistor, the second lower-arm resistor and the first upper-arm resistor are arranged in a cross configuration or in a rectangular shape.

14. The resistive pressure sensor as claimed in claim 1, wherein the first lower-arm resistor, the second upper-arm resistor, the second lower-arm resistor and the first upper-arm resistor are arranged in a single line.

15. The resistive pressure sensor as claimed in claim 1, wherein the circuit board has a plurality of pads electrically connected to the high potential terminal, the low potential terminal of the DC power source, and the two output voltage terminals, with the pads being located outside of the deformation zone.

16. A touchpad with a with a force sensing function comprising:
   a bracket having a plurality of cantilevers, each cantilever has a joint;

a plurality of resistive pressure sensors as claimed in claim 1, wherein the deformation zones of the circuit boards correspond to or are close to the joints of the cantilever; and a touchpad body mounted on the bracket, wherein the resistive pressure sensors are mounted between the touchpad body and the bracket, and the touchpad body has:

a carrier having a surface;

a plurality of sensing electrodes formed on the surface of the carrier;

a cover covering the carrier and the sensing electrodes; and a controller electrically connected to the sensing electrodes and the resistive pressure sensors.

17. The touchpad as claimed in claim 16, wherein each of the cantilevers has a free end opposite to the joint; and the bracket is a metal plate having a plurality of U-shaped through slots to form the cantilevers, wherein the cantilevers are respectively located at four corners of the bracket.

18. The touchpad as claimed in claim 17 further comprising a shock absorber pad mounted between the free end of each of the cantilevers and the touchpad body.

19. The touchpad as claimed in claim 18, wherein the free end of each of the cantilevers faces to a nearest short side of the bracket.

* * * * *